HIGH SPEED CONTROLLED RECTIFIERS WITH DEEP LEVEL DOPANTS

Original Filed Dec. 7, 1964

INVENTORS
TIMOTHY J. DESMOND
LEON S. GREENBERG
HARRY WEISBERG

BY Abraham Sherman
ATTORNEY

HIGH SPEED CONTROLLED RECTIFIERS WITH DEEP LEVEL DOPANTS

Original Filed Dec. 7, 1964

INVENTORS
TIMOTHY J. DESMOND
LEON S. GREENBERG
HARRY WEISBERG
BY Abraham Sherman
ATTORNEY INVENTORS
TIMOTHY J. DESMOND
LEON S. GREENBERG
HARRY WEISBERG
BY Abraham Sherman
ATTORNEY United States Patent Office 3,445,735

Patented May 20, 1969

3,445,735

HIGH SPEED CONTROLLED RECTIFIERS WITH DEEP LEVEL DOPANTS

Timothy J. Desmond, Greensburg, Pa., Leon S. Greenberg, Somerville, N.J., and Harry Weisberg, Forty Fort, Pa., assignors to Radio Corporation of America, a corporation of Delaware Original application Dec. 7, 1964, Ser. No. 416,521, now Patent No. 3,356,543, dated Dec. 5, 1967. Divided and this application Oct. 5, 1967, Ser. No. 673,142

Int. Cl. H01l *11/10*

U.S. Cl. 317—235 4 Claims

ABSTRACT OF THE DISCLOSURE

A fast switching semiconductor device such as athyristor or controlled rectifier comprising a crystalline semiconductive body having a PNPN structure, and a metal-diffused region adjacent one face of the body. The diffused metal is selected from the group consisting of nickel and cobalt. Adjacent the same one face of the body having the metal-diffused region is a zone diffused with a substance which reduces the lifetime of minority charge carriers in that zone. The combination of the metal and the substance prevents unduly increasing the resistivity of the semiconductive body. When the semiconductive body consists of silicon, the lifetime killer is suitably gold.

Figure 1A:
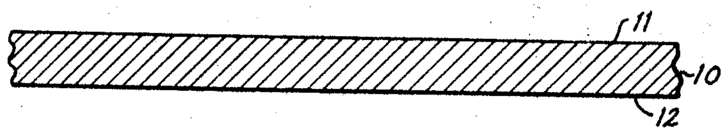
Figure 1B:
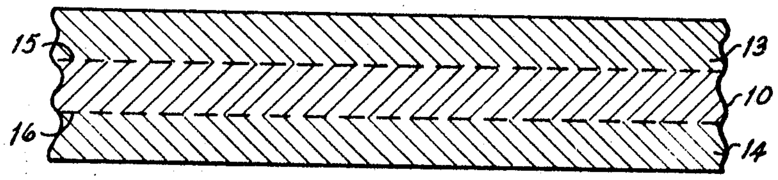
Figure 1C:
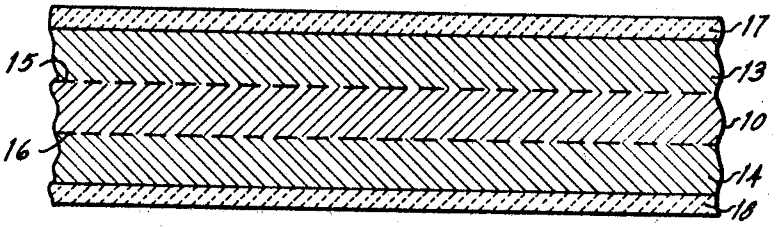
Figure 1D:
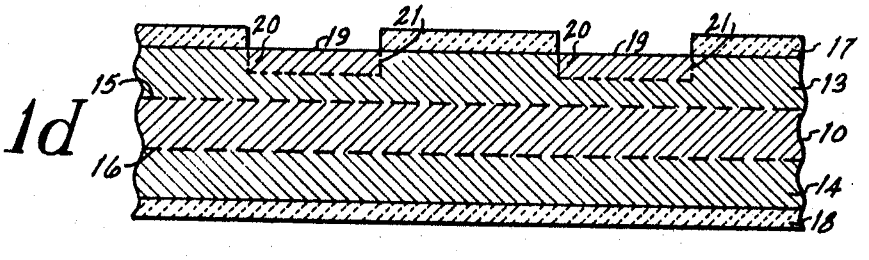
Figure 1E:
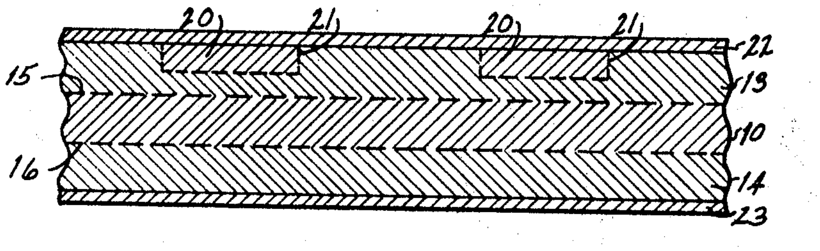
Figure 1F:
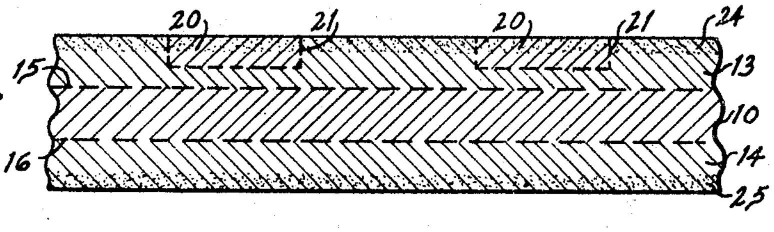
Figure 1G:
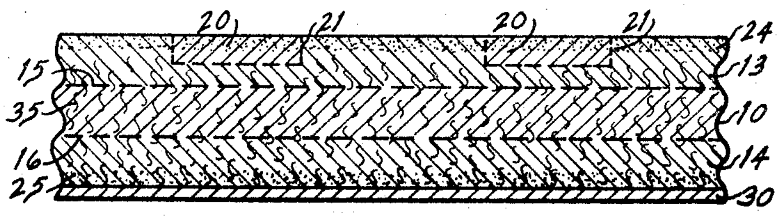
Figure 1H:
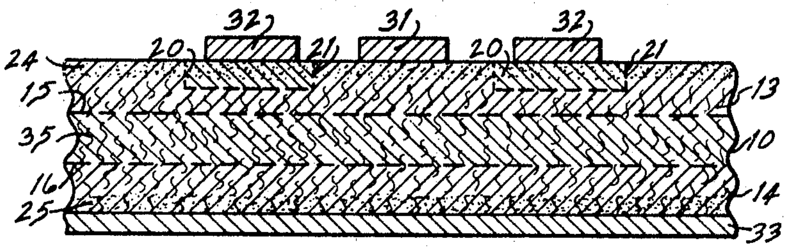
Figure 1J:
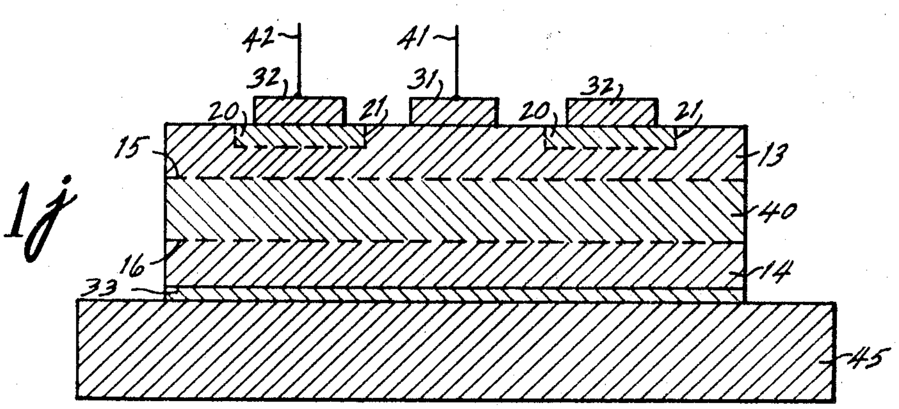

This application is a division of application Ser. No. 416,521, filed Dec. 7, 1964, issued Dec. 5, 1967 as U.S. Patent 3,356,543, and assigned to the assignee of this application.

BACKGROUND OF THE INVENTION

*Field of the invention*

This invention relates to improved semiconductor devices, and improved methods of fabricating them.

*Description of the prior art*

One class of semiconductive devices comprises units having four zones or regions of alternate conductivity types, and three rectifying barriers or p-n junctions between the four zones. For example, a device of this class may consist of a crystalline semiconductive wafer having two opposing major faces; a P-type region known as the anode region adjacent one major wafer face; an N-type region known as the base region adjacent to the anode; a P-type region known as the gate region adjacent the base; an N-type region known as the cathode region which extends from the gate region to the other major wafer face; and separate electrical connections to the anode, gate, and cathode regions. Devices of this type are known as controlled rectifiers, and are generally prepared from monocrystalline silicon wafers. They are also known as thyristors, and as PNPN or as NPNP switches.

The switching speed of prior art controlled rectifiers has not been as fast as is desirable for many applications. Attempts have been made to increase the switching speed of controlled rectifiers by diffusing into the semiconductive body a substance which is a lifetime killer for the particular semiconductor employed, that is, a substance which reduces the lifetime of minority charge carriers in the semiconductor. For example, gold has been diffused into controlled rectifiers made of silicon in order to decrease the minority charge carrier lifetime of the devices, and thereby increase their switching speed. However, when such introduction of a lifetime killer into a controlled rectifier is performed by prior art methods the resistivity of the semiconductive body is undesirably increased. For example, after the diffusion of gold into a silicon body, the resistivity of the semiconductive body in ohm-cm. is generally increased by a factor of more than 2. This increase in resistivity degrades other desirable electrical device parameters, such as the voltage blocking capability of the device for a given base width. If the base width is increased to restore the voltage blocking capability, then the turn-off time and the forward voltage drop of the device in the "on" state is undesirably increased.

Accordingly, it is an object of the invention to provide improved semiconductor devices.

Another object is to provide improved controlled rectifiers having high switching speeds.

Still another object is to provide improved methods of fabricating improved semiconductor devices.

But another object is to provide improved methods of fabricating improved high speed controlled rectifiers.

*The drawing*

Figure 2A:
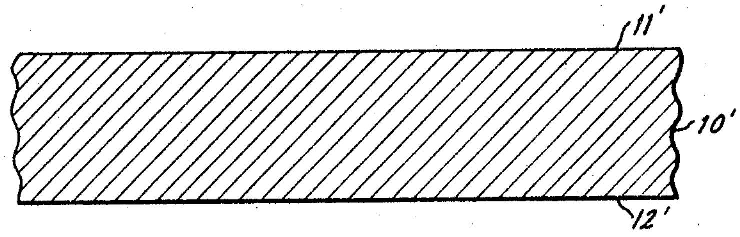
Figure 2B:
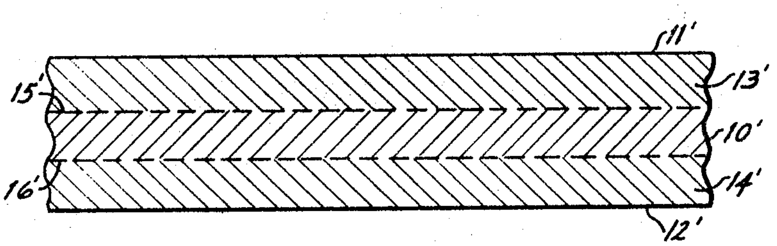
Figure 3A:
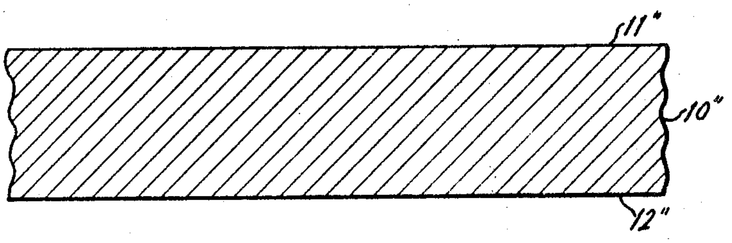
Figure 3B:
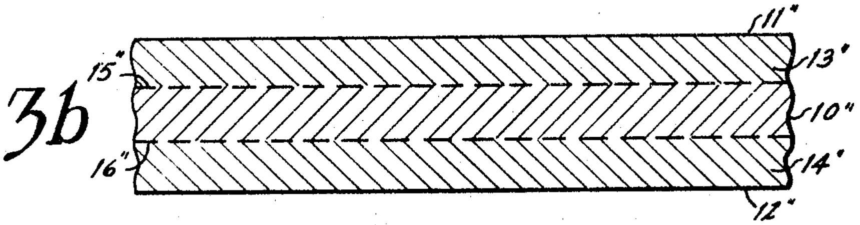

The invention and its features will be described by the following examples, considered in conjunction with the accompanying drawing, in which:

FIGURES 1*a*–1*j* are cross-sectional views of a semiconductive wafer during successive steps in the fabrication of one embodiment of a semiconductor device;

FIGURES 2*a*–2*b* are cross-sectional views of a semiconductive wafer during successive steps in the fabrication of another embodiment of a semiconductor device; and FIGURES 3*a*–3*b* are cross-sectional views of a semiconductive wafer during successive steps in the fabrication of another embodiment of a semiconductor device.

PREFERRED EMBODIMENTS

*Example I*

A body 10 (FIGURE 1*a*) of a crystalline semiconductive material such as silicon, silicon-germanium alloys, and the like is prepared with two opposing major faces 11 and 12. The precise size, shape, composition, conductivity type, and electrical resistivity of semiconductive body 10 is not critical. In this example, semiconductive body 10 consists of P conductivity type monocrystalline silicon having a resistivity of about 20 to 40 ohm-cm, and is in the form of a slice cut from a cylindrical ingot. Suitably, the slice is about 1″ in diameter, and about 5 to 10 mils thick. In practice, a large number of units are made simultaneously on the body 10. FIGURE 1 illustrates for greater clarity the fabrication of only a single device from a small part of the entire semiconductive body or wafer 10. In FIGURES 1*a*–1*j*, the thicknesses of the various regions shown in the drawing are not to scale, having been exaggerated for greater clarity.

Zones of opposite conductivity type are now formed in semiconductive body 10 immediately adjacent each said major face. Such zones may be made by standard techniques known to the semiconductor art, such as epitaxial deposition, or diffusion. In this example, epitaxial layers 13 and 14 (FIGURE 1*b*) consisting of monocrystalline silicon of conductivity type opposite to that of the original wafer are grown on wafer faces 11 and 12 respectively. Since the original body 10 was P-type in this example, the epitaxial layers 13 and 14 consist of N-type silicon in this example. Several techniques for the deposition of epitaxial layers of predetermined conductivity type are described for example in RCA Review, vol. 24, No. 4, p. 499-595, December 1963. The exact thickness of epitaxial layers 13 and 14 is not critical, and is suitably about ½ to 3 mils. Rectifying barriers 15 and 16 are formed at the interface or boundary between the original body 10 and the epitaxial layers 13 and 14 respectively. In the following description, the term "wafer" will be used to refer to the semiconductive body 10 and the added epitaxial layers 13 and 14 in any of the subsequent processing states.

Masking layers 17 and 18 (FIGURE 1*c*) are deposited on the surface of epitaxial layers 13 and 14 respectively. Masking layers 17 and 18 consist of an inert material which slows or prevents the diffusion of a conductivity modifier into the semiconductivity modifier into the semiconductive wafer. Suitable masking layers 17 and 18 may consist of silicon oxide, and may be deposited by heating the wafer in the vapors of a siloxane compound, as described in U.S. Patent 3,089,793, issued to E. J. Jordan and D. J. Donahue on May 14, 1963, and assigned to the assignee of this application. Alternatively, when the semiconductive wafer consists of silicon, as in this example, the silicon oxide layers 17 and 18 may be formed by heating the wafer for several hours in an ambient containing oxygen, or water vapor, or both.

A predetermined ring-shaped or annular portion of one silicon oxide layer 17 is removed from the suface of epitaxial layer 13 by an convenient method, such as lapping, or grinding, or masking and etching. An annular portion 19 (FIGURE 1*d*) of epitaxial layer 13 is thus exposed. The wafer is now heated in the vapors of a conductivity modifier capable of inducing in the semiconductive layer 13 the conductivity type of the original body 10. In this example, since body 10 consists of P-type silicon, the wafer is heated in the vapors of an acceptor such as boron oxide ($B_2O_3$) or the like. Boron is thereby diffused into the exposed portion of epiltaxial layer 13, while the silicon oxide layer 18 and the remainder of silicon oxide layer 17 serve as masks against the diffusion of boron into the unexposed portion of the wafer. A thin annular or ring-shaped boron-diffused P-type region 20 is thus formed in layer 13 immediately adjacent the exposed surface portion 19 thereof. The boron-diffused region 20 is thinner than the N-type epitaxial region 13. A rectifying barrier or p-n junction 21 is thus formed at the boundary or interface between boron-diffused P-type region 20 and the remainder of the N-type epitaxial layer 13.

The masking layers 17 and 18 are now removed. When layers 17 and 18 consist of silicon oxide, as in this example, they are conveniently removed by treating the wafer with an aqueous hydrofluoric acid solution. Thin metallic films 22 and 23 (FIGURE 1*e*) are now deposited on the surfaces of epitaxial layers 13 and 14 respectively by any convenient method. Metallic films 22 and 23 may suitably consist of nickel, cobalt, or alloys of these, and may be deposited, e.g., by evaporating, or sputtering, or electroplating, or electroless plating. In this example, metallic layers 22 and 23 consist of cobalt, are about 0.01 to 0.5 mils thick, and are deposited by electroless plating techniques, such as described in U.S. Patent 2,430,581, issued Nov. 11, 1947, to L. Pessel, and assigned to the assigness of this application.

The semiconductive body of wafer 10 is now heated in a non-oxidizing ambient for about ¼ to 1 hour at a temperature of about 850° *C.* The ambient may be an inert gas such as argon, nitrogen, and the like, or a reducing gas such as forming gas, hydrogen, and the like. During this step, the metallic films 22 and 23 are sintered and diffused into the semiconductive body 10, and appear to act as getters by serving as a sink into which some of the impurities present in the semiconductive body 10 and epitaxial layers 13 and 14 can diffuse. The semiconductive body 10 is now treated in a boiling solution of a metallic chloride such as zinc chloride or nickel cholride in hydrochloric acid for a period of time sufficient to remove all of the excess metal from the surfaces of the semiconductive wafer. A period of about 1 to 30 minutes is usually sufficient for this purpose. This treatment removes all of the excess metal of layers 22 and 23 which has not been diffused into the wafer 10 and the layers 13 and 14. Adjacent the surface of epitaxial layers 13 and 14, two cobalt-diffused regions 24 and 25 respectively (FIGURE 1*f*) are thus formed. The cobalt-diffused regions 24 extends across the boron-diffused regions 20 as well as the remainder of the epitaxial layer 13.

Advantageously, wafer 10 is now treated in a hydrofluoric acid solution to remove any oxides which may have formed on the wafer surface.

A thin film 30 (FIGURE 1*g*) of a substance which is a lifetime killer for the semiconductive body 10 is now deposited on the surface of epitaxial layer 14 by any convenient method. In this example, wherein the semiconductive body 10 consists of silicon, the film 30 of lifetime killing material suitably consists of gold, and is conveniently deposited by evaporation. Preferably, film 30 is not less than 1 and not more than 200 angstroms thick.

The semiconductive wafer is now heated in a non-oxidizing ambient for about ¼ to 5 hours. It has been found that for best results, that is, for minimum increase of wafer resistivity, the temperature of this heating step should be maintained within narrow limits of about 860° C. to 900° C. At lower temperatures, not enough gold diffuses into the wafer, while at higher temperatures the resistivity of the wafer increases rapidly and undesirably. During this step, the gold film 30 diffuses through the metal-diffused region 25 and into the silicon wafer. The gold-diffused region 35 (FIGURE 1*h*) thus formed is thicker than the metal-diffused region 25, and extends through the thickness of layer 14 at least to p-n junction 16, and preferably to p-n junctions 15 and 21. Conveniently, this diffusion step is performed for a period of time sufficient to diffuse the lifetime killer (gold in this example) through the entire thickness of the semiconductive wafer.

The semiconductive wafer is now cooled to room temperature. For best results and minimum increase in wafer resistivity the cooling rate should not exceed 200° C. per minute. It is preferred to cool the semiconductive wafer at a much slower cooling rate of about 1 to 10° C. per minute.

The surface of epitaxial layer 13 is now suitably masked by any convenient method, for example by means of a photoresist layer (not shown). A metallic electrode layer 33 (FIGURE 1*h*) is deposited on the entire surface of epitaxial layer 14 by any convenient method. A metallic electrode 31 is deposited on a portion of epitaxial layer 13, and an annular or ring-shaped metallic electrode 32 is deposited on epitaxial layer 13 around electrode 31 and in contact with the annular P-type region 20. Conveniently, the electrodes 31, 32 and 33 consist of the same metal or alloys, and are deposited simultaneously. In this example, the electrodes 31, 32 and 33 consist of nickel, and are deposited by standard electroplating techniques. The electrodes 31, 32 and 33 may subsequently be given a coating (not shown) of a metal such as lead to facilitate the bonding of electrical lead wires thereto.

The semiconductive wafer is now diced into individual pellets or dies 40 (FIGURE 1*j*), each die being about 50 mils square in this example. The metallic layer 33 of each individual die 40 is bonded to a metallic header 45. Electrical lead wires 41 and 42 are attached to electrodes 31 and 32 respectively, for example by thermocompression bonding. In the operation of the device, the header 45 serves as the anode lead, lead wire 41 serves as the cathode lead and lead wire 42 serves as the gate lead.

The conductivity types of the various regions in the device of this example may be reversed, using suitable acceptors and donors for each.

It has unexpectedly been found that when a lifetime killer such as gold is introduced into a semiconductive wafer by diffusion at a particular temperature range through a wafer surface zone which has previously been diffused with a metal such as nickel or cobalt, the increase in wafer resistivity is minimized. Additional improvement is obtained if the wafer is then cooled to room temperature at a rate less than 200° C. per minute. The increase in resistivity of the wafer is then generally less than 100 percent. Moreover, the electrical parameters of the completed device, such as the blocking capability, are unexpectedly improved. The reasons for this improvement are not presently clear, but the invention may be practiced without regard to whatever theory is selected to explain the observed results.

*Example II*

In the previous example, the semiconductive body utilized consisted of P-type silicon, and epitaxial techniques were employed. In this example, a P-type semiconductive body and diffusion techniques are employed.

Referring now to FIGURE 2*a*, a semiconductive body 10' having two opposing major faces 11' and 12' is prepared. In this example, the semiconductive body 10' consists of a monocrystalline P-type silicon-germanium alloy, such as is described in B. Selikson U.S. Patent 2,997,410, issued on Aug. 22, 1961, and assigned to the assignee of this application. A silicon-rich alloy is preferred for this purpose.

Semiconductive body 10' is heated in the vapors of a conductivity modifier capable of inducing opposite conductivity type in the semiconductive body. In this example, since the semiconductive body is P-type, a suitable conductivity modifier is a donor such as arsenic or phosphorus. The semiconductive body 10' is heated in the vapors of phosphorus pentoxide for about 10 hours at about 1250° C. to form two phosphorus-diffused N-type zones 13' and 14' (FIGURE 2*b*) adjacent major wafer faces 11 and 12 respectively. Zones 13' and 14' are suitably about ½ to 3 mils thick. Rectifying barriers 15' and 16' are formed between the N-type diffused regions 13' and 14' respectively, and the P-type bulk of semiconductive body 10. It will be recognized that the general configuration of semiconductive wafer in FIGURE 2*b* is now similar to that of the semiconductive wafer in FIGURE 1*b*, except that the conductivity types of the various zones are reversed. The wafer of FIGURE 2*b* has a PNP structure, while the wafer of FIGURE 1*b* has an NPN structure. The remaining steps of this embodiment will be described with reference to FIGURES 1*c*–1*j*.

Masking layers 17 and 18 (FIGURE 1*c*) are now deposited on wafer faces 11 and 12 respectively. If the masking layers cannot be made by thermal oxidation of the wafer, other masking materials such as magnesium oxide may be utilized. Alternatively, an organic siloxane compound may be thermally decomposed, and the decomposition products forced through a jet to impinge upon the semiconductive wafer and thus coat the wafer with silicon oxide, as described in J. Klerer U.S. Patent 3,114,663, issued Dec. 17, 1963, and assigned to the assignee of this application.

The fabrication of the device is continued in a manner similar to that described in Example I above. An annular portion of masking layer 17 is removed, exposing an annular portion 19 (FIGURE 1*d*) of N-type zone 13. An acceptor such as boron or the like is now diffused into the unmasked portion of wafer 10 to form a P-type region 20 within the N-type zone 13, and a p-n junction 21 between the boron-diffused region 20 and the phosphorus-diffused zone 13.

Masking layers 17 and 18 are now removed, and metallic layers 22 and 23 (FIGURE 1*e*) are deposited on the surfaces of zones 13 and 14 respectively. In this example, the metallic films 22 and 23 consist of an alloy of nickel and cobalt. The alloy may be conveniently deposited by the electroless plating method mentioned above. The semiconductive body 10 is then heated to sinter the metallic films 22 and 23. Portions of metallic films 22 and 23 diffuse into zones 13 and 14 respectively, forming the metal-diffused zones 24 and 25 (FIGURE 1*f*) respectively. The remaining portions of the sintered metallic films 22 and 23 are now removed by any convenient method, for example by treating the wafer in a hot aqueous solution of nickel chloride, cobalt chloride, and hydrochloric acid.

A gold film 30 (FIGURE 1*g*) about 1 to 200 angstroms thick is deposited on the surface of zone 14. The wafer 10 is then heated in a non-oxidizing ambient to a temperature of about 860° C. to 900° C. so as to diffuse the gold film 30 into the wafer, and form a gold-diffused region 35 therein. Wafer 10 is then cooled to room temperature at a rate less than 200° C. per minute.

The remaining steps of forming electrodes 31, 32 and 33 (FIGURE 1*h*) to zone 13, region 20 and zone 14 respectively, dicing the wafer into dies, mounting each die 40 on a header 45 (FIGURE 1*j*) and attaching electrical lead wires 41 and 42 to electrodes 31 and 32 respectively, are performed by standard methods of the art as described in Example I.

*Example III*

In this example, a semiconductive body 10'' (FIGURE 3*a*) consisting of N conductivity type monocrystalline silicon having a resistivity of about 20 to 40 ohm-cm. is prepared as a wafer with two opposing major faces 11'' and 12''. Suitably, wafer 10'' is about 5 to 10 mils thick.

Referring now to FIGURE 3*b*, the semiconductive body 10'' is heated in an ambient including the vapors of an acceptor such as boron and the like to form two boron-diffused P-type zones 13'' and 14'' immediately adjacent wafer faces 11'' and 12'' respectively. In this example, body 10'' is heated in an ambient of nitrogen and boron oxide ($B_2O_3$) vapors for about 20 hours at about 1300° C. A suitable ambient concentration of boron oxide vapors may be obtained by heating a container of boron oxide (not shown) to about 860° C. The P-type boron-diffused zones 13'' and 14'' thus formed about 1¾ to 2 mils thick, and the concentration of boron atoms on wafer faces 11'' and 12'' is about $2 \times 10^{18}$ per cm.³. The general configuration of the semiconductive wafer in FIGURE 3*b* is now similar to that of the wafer in FIGURE 1*b*. The remaining steps of this embodiment will be described with reference to FIGURES 1*c*-1*j*.

Wafer 10 is now heated in steam for about 3 hours at about 1200° C. Silicon oxide layers 17 and 18 (FIGURE 1*c*) are thus formed on the surfaces of the boron-diffused zones 13 and 14 respectively. An annular portion of silicon oxide layer 17 is removed by standard masking and etching techniques, thus exposing the corresponding portion (FIGURE 1*d*) of boron-diffused zone 13. Wafer 10 is reheated in the vapors of phosphorus pentoxide for about 1½ hours at about 1225° C. to form a phosphorus-diffused N-type region 20 within the boron-diffused zone 13. A p-n junction 21 is formed at the interface between N-type region 20 and P-type zone 13.

Silicon oxide layers 17 and 18 are removed by treating the wafer in an aqueous solution of hydrofluoric acid. Nickel films 22 and 23 are deposited on the surface of zones 13 and 14 by standard electroplating techniques, such as described in A. Brenner, Electrodeposition of Alloys, Academic Press, New York, 1963. The silicon body 10 is then heated in a moist hydrogen ambient at about 850° C. to sinter the nickel films 22 and 23. A portion of the nickel diffuses from films 22 and 23 into wafer zones 13 and 14 respectively, forming nickel-diffused regions 24 and 25 (FIGURE 1*f*) respectively.

Wafer 10 is treated in a boiling solution of nickel chloride and hydrochloric acid for a period of about 1 to 30 minutes to remove the sintered nickel films 22 and 23. A gold film 30 (FIGURE 1*g*) about 1 to 200 angstroms thick is deposited on the surface of zone 14. The wafer is then heated in a nonoxidizing ambient for about ¼ to 5 hours at about 860° C. to 900° C. The gold film 30 is thus diffused into the wafer, forming a gold-diffused region 35 therein. In this example, the gold-diffused region 35 extends completely through the thickness of the semiconductive body 10. Semiconductive body 10 is then cooled to room temperature at a rate less than 200° C. per minute, and preferably at a rate of about 1 to 10° C. per minute. It has unexpectedly been found that the restivity of the silicon wafer is not increased at all if gold is diffused into the wafer in the manner described.

The remaining steps of attaching electrodes to the diffused region 21 and to zones 13 and 14, then dicing the wafer into dies, mounting each die on a metallic header, and attaching electrical lead wires to the electrodes, are similar to those described in Example I above.

Prior art silicon controlled rectifiers have a turn-off time of about 20 to 40 microseconds. It has been found that silicon controlled rectifiers made as described in this example have a turn-off time of about 2 to 5 microseconds, which is an improvement of about an order of magnitude.

It has also been found that the blocking capability of the controlled rectifiers fabricated according to the invention is unexpectedly improved. Conventional silicon controlled rectifiers of the prior art have a blocking capaccontrloled rectifiers of the prior art have a blocking capability of about 800 volts, whereas devices according to this example have a blocking capability of about 1000 volts.

While the invention has been described above in terms of a controlled rectifier, the same technique for decreasing the minority carrier lifetime of a semiconductive body without unduly increasing the resistivity of the body may be applied to the fabrication of other semiconductive devices such as transistors and rectifiers.

It will be understood that the above examples are by way of illustration only, and not limitation. Other semiconductive materials may be utilized, together with appropriate lifetime killers and acceptors and donors. The invention may also be practiced by diffusing the nickel or cobalt into only one major wafer face, and subsequently diffusing the lifetime killer into the wafer through the same one wafer face. Various other modifications may be made by those skilled in the art without departing from the spirit and scope of the invention as set forth in the specification and appended claims.

We claim:

1. A semiconductive device comprising a crystalline semiconductive body of given conductivity type having first and second opposing faces:

first and second zones of opposite conductivity type adjacent said first and second faces respectively;

rectifying barriers between said first and second zones and said body;

a region of said given conductivity type in said first zone immediately adjacent said first face;

a rectifying barrier between said region and said first zone;

a metal-diffused region immediately adjacent said second face, said metal being selected from the group consisting of nickel, cobalt, and nickel-cobalt alloys;

a third zone adjacent said second face containing a substance which reduces the lifetime of minority charge carriers in said body, said substance being different from said metal; and electrical connections to said first and second zones and to said given type region.

2. A device as in claim 1, wherein said substance in said third zone is gold.

3. A semiconductive device comprising a crystalline semiconductive body of given conductivity type having first and second opposing faces;

first and second epitaxial layers of opposite conductivity type semiconductive material adjacent said first and second faces respectively;

rectifying barriers between said first and second epitaxial layers and the bulk of said body;

a region of said given conductivity type in said first epitaxial layer immediately adjacent the surface of said first layer;

a rectifying barrier between said given conductivity type region and the bulk of said first epitaxial layer;

a metal-diffused region immediately adjacent the surface of said second epitaxial layer, said metal being selected from the group consisting of nickel, cobalt, and nickel-cobalt alloys;

a third zone adjacent the surface of said second epitaxial layer containing a substance which reduces the lifetime of minority charge carriers in said body, said substance being different from said metal; and electrical connections to said first and second epitaxial layers and to said given type region.

4. A semiconductive device comprising a monocrystalline silicon body of given conductivity type having first and second opposing faces;

first and second zones of opposite conductivity type adjacent said first and second faces respectively;

first and second rectifying barriers between said first and second zones and the bulk of said body;

a region of said given conductivity type in said first zone immediately adjacent said first face;

a third rectifying barrier between said region and said first zone;

a nickel-diffused region immediately adjacent said second face;

a third zone immediately adjacent said second face diffused with gold, said gold-diffused zone being thicker than said nickel-diffused region; and electrical connections to said first and second zones and to said given conductivity type region.

References Cited

UNITED STATES PATENTS

| | | | |
|---|---|---|---|
| 3,246,172 | 4/1966 | Sanford | 307—88.5 |
| 3,327,183 | 6/1967 | Greenberg et al. | 317—235 |
| 3,342,651 | 9/1967 | Raithel | 148—188 |
| 3,349,299 | 10/1967 | Herlet | 317—235 |

JOHN W. HUCKERT, *Primary Examiner.*

R. F. SANDLER, *Assistant Examiner.*

U.S. Cl. X.R.

148—175, 188